United States Patent
Pialot et al.

(10) Patent No.: US 10,807,308 B2
(45) Date of Patent: Oct. 20, 2020

(54) MACHINE AND PROCESS FOR POWDER-BASED ADDITIVE MANUFACTURING

(71) Applicant: COMPAGNIE GENERALE DES ETABLISSEMENTS MICHELIN, Clermont-Ferrand (FR)

(72) Inventors: Frédéric Pialot, Clermont-Ferrand (FR); Gilles Walrand, Clermont-Ferrand (FR); Pierre Wiel, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 279 days.

(21) Appl. No.: 15/952,915

(22) Filed: Apr. 13, 2018

(65) Prior Publication Data
US 2018/0229307 A1     Aug. 16, 2018

Related U.S. Application Data

(62) Division of application No. 14/366,130, filed as application No. PCT/EP2012/076225 on Dec. 19, 2012, now abandoned.

(30) Foreign Application Priority Data

Dec. 20, 2011 (FR) ..................................... 11 62067

(51) Int. Cl.
*B29C 64/218* (2017.01)
*B33Y 30/00* (2015.01)
(Continued)

(52) U.S. Cl.
CPC ............ *B29C 64/218* (2017.08); *B05C 19/04* (2013.01); *B05D 3/007* (2013.01); *B05D 3/14* (2013.01);
(Continued)

(58) Field of Classification Search
None
See application file for complete search history.

(56) References Cited

U.S. PATENT DOCUMENTS

| 3,667,422 A | 6/1972 | Saladin ........................... 118/34 |
| 4,011,036 A | 3/1977 | Bichet ........................... 425/217 |

(Continued)

FOREIGN PATENT DOCUMENTS

| EP | 1 234 625 A1 | 8/2002 |
| EP | 1 700 686 A2 | 9/2006 |

(Continued)

OTHER PUBLICATIONS

May 17, 2013 International Search Report and Written Opinion in International Patent Appln. No. PCT/EP2012/076225.

*Primary Examiner* — Joel G Horning
(74) *Attorney, Agent, or Firm* — Venable LLP

(57) ABSTRACT

The invention relates in particular to a machine (1) for additive manufacturing by the sintering or melting of powder (2) using an energy beam (3) acting on a powder layer (23) in a working zone (4), said machine comprising a device for producing a layer of said powder, said device comprising:
- means (5) for storing the powder,
- means (6) for distributing the powder able to travel over the working zone in order to distribute the powder in a layer (23) having a final thickness (24) adapted to additive manufacturing,
- feeding means (7) able to transfer the powder from the storage means (5) to the distributing means (6),
- dosing means (8) able to control the quantity of powder transferred from the storage means (5) to the distributing means (6), said machine being characterised in that:
(Continued)

the storage means (5) are located above the working zone (4),
the feeding means (7) utilise gravity, and
the feeding means (7) and the dosing means (8) are able to move with the distributing means (6).

9 Claims, 4 Drawing Sheets

(51) Int. Cl.
| | |
|---|---|
| B23K 35/02 | (2006.01) |
| B22F 3/105 | (2006.01) |
| B29C 64/343 | (2017.01) |
| B29C 64/205 | (2017.01) |
| B29C 64/255 | (2017.01) |
| B29C 64/329 | (2017.01) |
| B05C 19/04 | (2006.01) |
| B05D 3/00 | (2006.01) |
| B05D 3/14 | (2006.01) |
| B22F 7/02 | (2006.01) |
| B29C 64/153 | (2017.01) |

(52) U.S. Cl.
CPC ............ *B22F 3/105* (2013.01); *B22F 3/1055* (2013.01); *B22F 7/02* (2013.01); *B23K 35/0244* (2013.01); *B29C 64/153* (2017.08); *B29C 64/205* (2017.08); *B29C 64/255* (2017.08); *B29C 64/329* (2017.08); *B29C 64/343* (2017.08); *B33Y 30/00* (2014.12); *B22F 2003/1056* (2013.01); *Y02P 10/25* (2015.11)

(56) References Cited

U.S. PATENT DOCUMENTS

| | | | | |
|---|---|---|---|---|
| 4,860,928 | A | * | 8/1989 | Shimazu .................. B01J 8/002 222/167 |
| 5,715,646 | A | | 2/1998 | Smekens .......................... 53/121 |
| 6,767,499 | B1 | | 7/2004 | Hory et al. .................... 264/497 |
| 7,789,037 | B2 | | 9/2010 | Teulet .............................. 118/64 |
| 9,593,266 | B2 | | 3/2017 | Merino Lopez et al. .................... C09J 107/00 |
| 2002/0152002 | A1 | | 10/2002 | Lindemann et al. ......... 700/119 |
| 2005/0263934 | A1 | | 12/2005 | Chung et al. ................. 264/113 |
| 2008/0150192 | A1 | | 6/2008 | Perret et al. .................. 264/308 |
| 2012/0164322 | A1 | | 6/2012 | Teulet ........................... 427/180 |

FOREIGN PATENT DOCUMENTS

| | | |
|---|---|---|
| WO | WO 2005/002764 A1 | 1/2005 |
| WO | WO 2008/061727 A1 | 5/2008 |
| WO | WO 2010/061174 A2 | 6/2010 |
| WO | WO 2011/007087 A2 | 1/2011 |

* cited by examiner

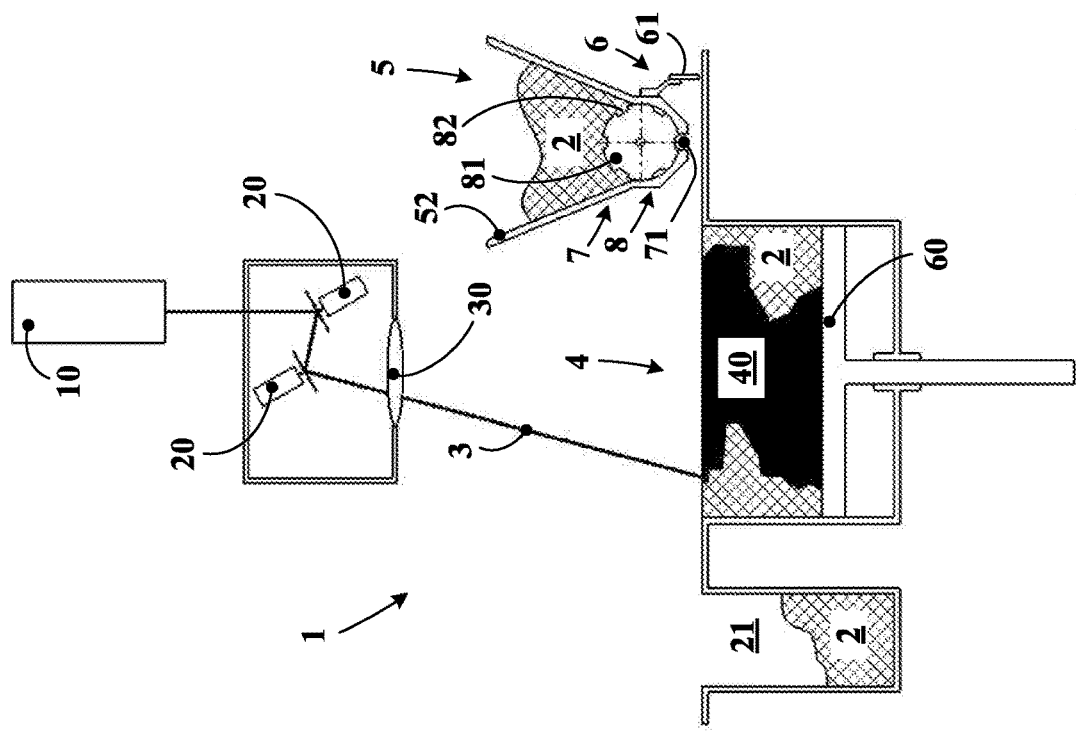
fig. 2
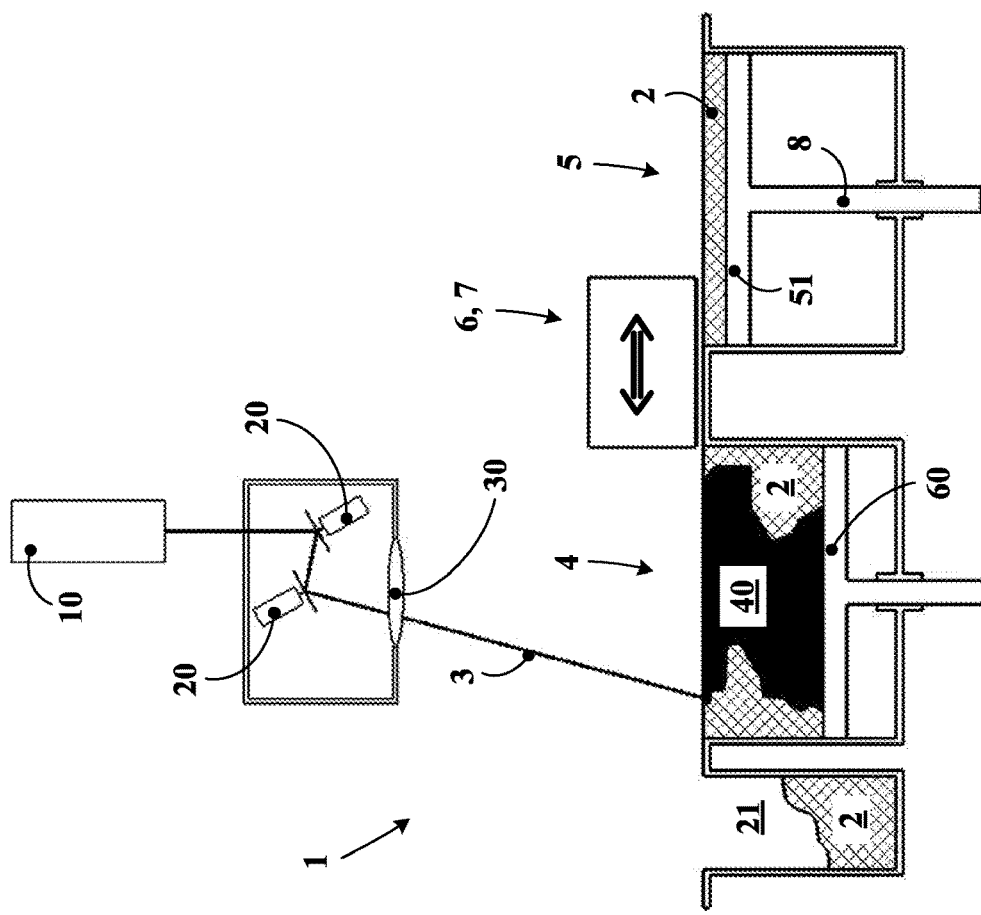
fig. 1 (state of the art)

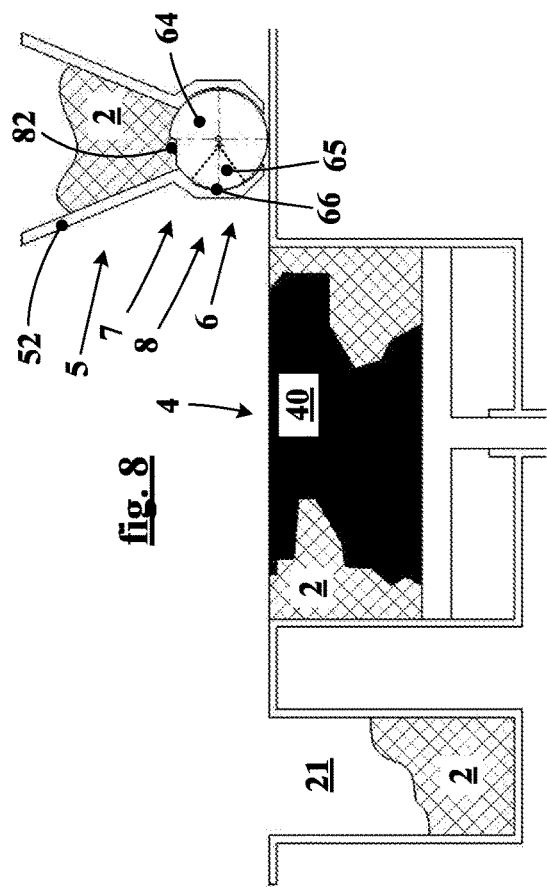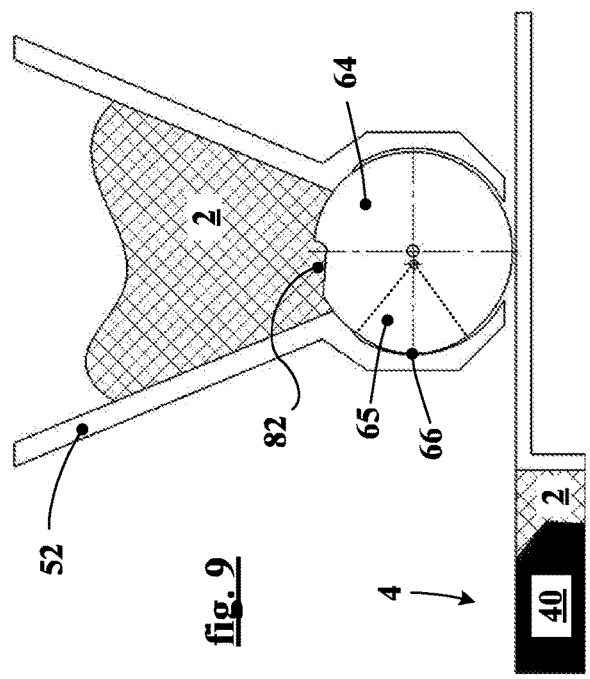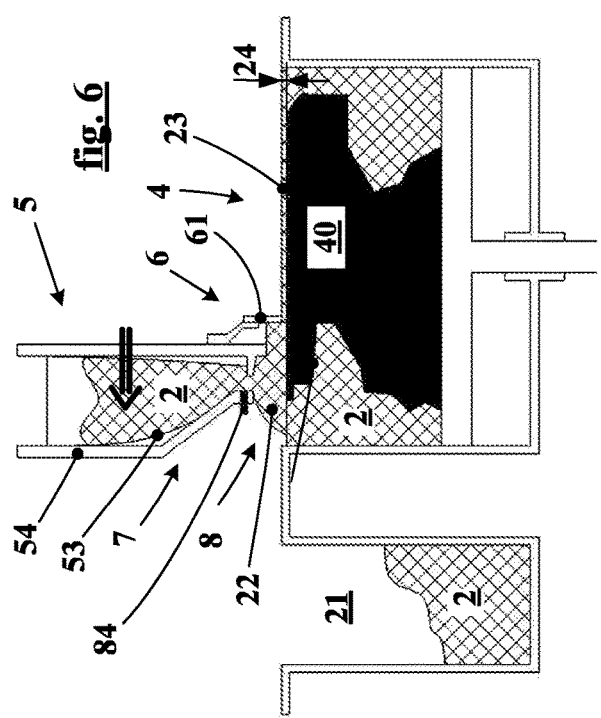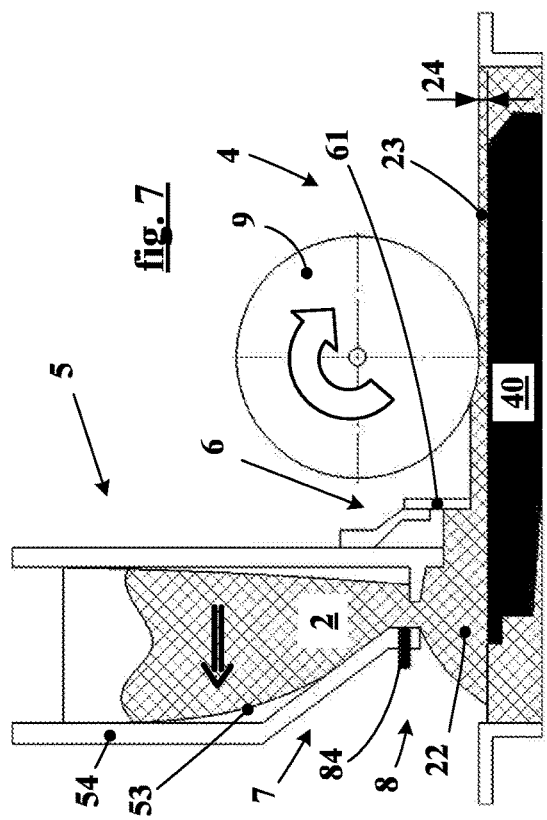

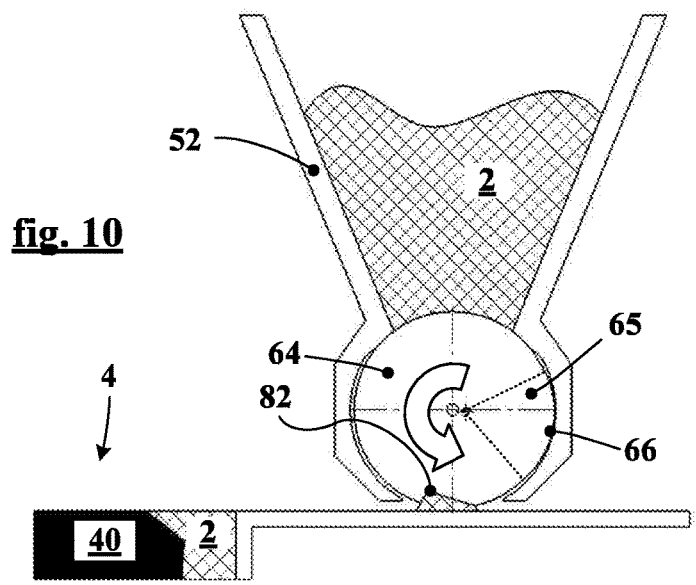
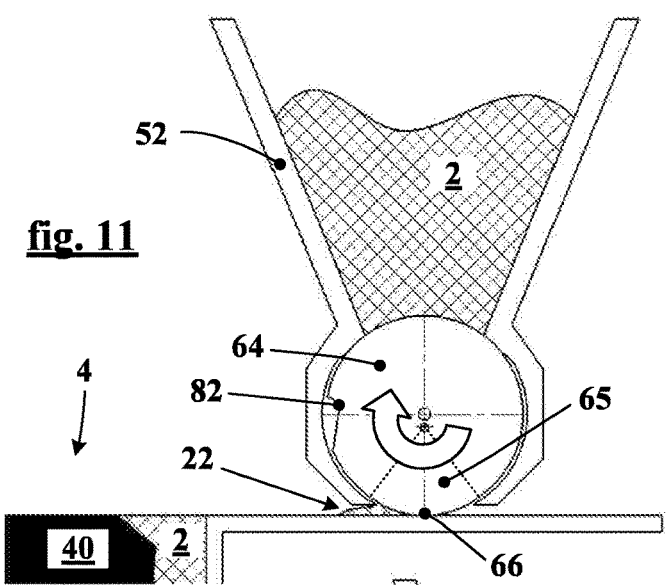
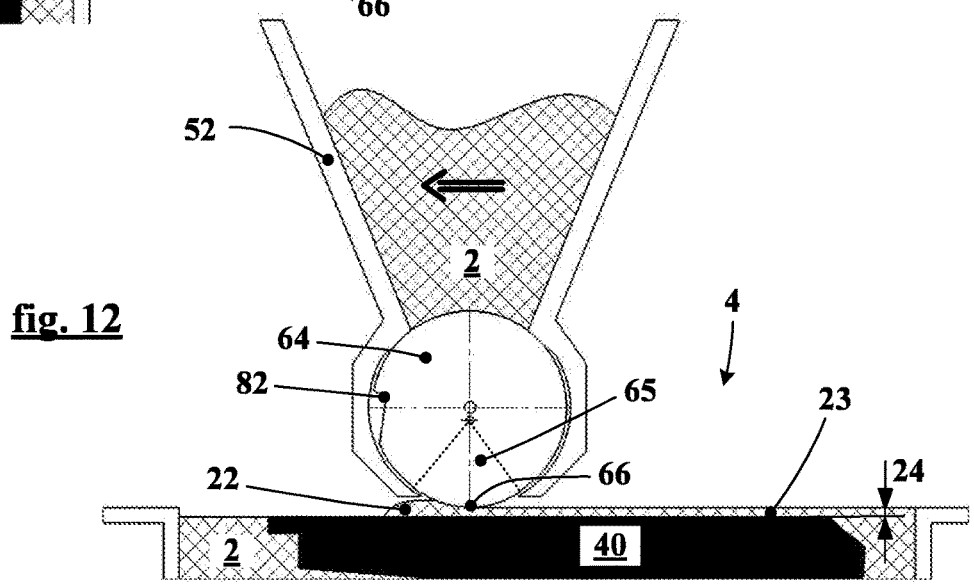

MACHINE AND PROCESS FOR POWDER-BASED ADDITIVE MANUFACTURING

CROSS REFERENCE TO RELATED APPLICATIONS

This application is a division of U.S. application Ser. No. 14/366,130, which was filed on Jun. 17, 2014, as a national-stage application of International Application No. PCT/EP2012/076225, which was filed on Dec. 19, 2012. The entire disclosures of these earlier applications are incorporated by reference herein.

The invention relates to the machines and processes for powder-based additive manufacturing by sintering or melting granules of said powder using an energy beam such as electromagnetic radiation (for example a laser beam) or a beam of particles (for example an electron beam).

More specifically, the invention relates to the means and to the processes for layering, that is to say for preparation, of the bed of powder prior to sintering or to melting of said layer using the energy beam.

Document EP-1641580-B1 in particular discloses a layering device for sintering of powders (metallic or ceramic) by laser. This device comprises a feed tray permitting the powder to be stored and to be delivered in a controlled quantity to a grooved cylinder capable, on the one hand, of transferring and distributing said quantity of powder on the depositing tray during a first passage of the cylinder on the working zone and, on the other hand, of compacting the powder by a rolling movement of the cylinder during a second passage. The powder is then subjected to the laser beam. One disadvantage of this configuration is the size and the considerable cost of the feed tray. Another disadvantage is derived from the fact that the length of the working zone is limited by the useful perimeter of the cylinder.

Document WO-2011/007087-A2 discloses a layering device for melting powders by laser. This device comprises a feed tray permitting the powder to be stored and to be delivered in a controlled quantity to a scraper system capable of feeding the depositing tray and cylinder(s) capable of distributing and compacting said quantity of powder on the depositing tray. The powder is then subjected to the laser beam. One disadvantage of this configuration is the size and the considerable cost of the feed tray as well as the necessary complexity of the machine because of the large number of tools to be controlled (scraper, distribution and/or compacting cylinder(s), rams for the trays).

Document US-2005/0263934-A1 discloses a layering device for sintering powders by laser. This device comprises feeding and dosing means permitting the powder to be delivered in a controlled quantity in the vicinity of the working zone. Feeding takes place by gravity from a stock of powder situated above. A scraper permits the regulation of the thickness of a mass of powder, which is then subjected to a preheating operation. A rotary cylinder then permits said quantity of preheated powder to be transferred and distributed on the working zone. A quantity of powder may likewise be deposited on the cover of the carriage carrying the cylinder from one side to the other of the working zone and is accordingly only applied during the return of the cylinder. One disadvantage of this configuration is the risk of a part (even a very small part) of the powder being retained on the cover and subsequently falling into the working zone during the passage of the carriage above the bed of powder. This risk is not acceptable in the context of industrial use.

An additional problem that is common to the different proposals of the prior art is the difficulty and sometimes the impossibility of achieving a homogeneous thickness and density for the powder layer over the entire extent (length, width) of the working zone.

The object of the invention is thus to overcome at least one of the disadvantages described above.

The invention proposes for this purpose a machine for additive manufacturing by sintering or melting powder using an energy beam acting on a powder layer in a working zone, said machine comprising a device for producing a layer of said powder, said device comprising:
  means for storing the powder,
  means for distributing the powder able to travel over the working zone in order to distribute the powder in a layer having a final thickness adapted to additive manufacturing,
  feeding means able to transfer the powder from the storage means to the distributing means,
  dosing means able to control the quantity of powder transferred from the storage means to the distributing means,
said machine being characterised in that:
  the storage means are located above the working zone,
  the feeding means utilise gravity, and
  the feeding means and the dosing means are able to move with the distributing means.

Feeding by gravity via the top of the working zone and in a controlled quantity by dosing means integrated with the distributing means ensures significantly improved uniformity of the bed of powder than in the systems that are familiar from the prior art.

The storage means preferably comprise a hopper, said hopper being able to move together with the feeding means, the dosing means and the distributing means.

The dosing means preferably comprise a rotating dosing cylinder provided with at least one cavity, preferably a groove capable of defining a dose of powder during dosing.

The dosing means alternatively comprise a sliding trap-door.

The distributing means preferably comprise a scraper.

The distributing means alternatively comprise a distribution cylinder, of which the height is preferably adjustable according to its angular position.

According to a preferred embodiment of the invention, the distributing means and the dosing means utilise a common cylinder.

The machine according to the invention preferably in addition comprises a compacting roller, of which the displacement in translation is integral with the displacement of the distributing means.

The invention likewise proposes a process for additive manufacturing by sintering or melting powder using an energy beam acting on a layer of powder in a working zone, said machine comprising a device for layering said powder, said device comprising:
  means for storing the powder located above the working zone,
  means for distributing the powder able to travel over the working zone in order to distribute the powder in a layer having a final thickness adapted to additive manufacturing,
  feeding means able to transfer the powder from the storage means to the distributing means,
  dosing means able to control the quantity of powder transferred from the storage means to the distributing means, said process comprising layering stages consisting successively of:
  dosing a quantity of powder to be transferred from the storage means,
  feeding the distributing means by gravity,
  distributing said quantity of powder on the working zone using the distributing means, said process being characterised in that the storage means, the feeding means and the dosing means are integral with the distributing means, while said distributing means travel over the working zone.

The invention will be more readily appreciated from the rest of the description, which is based on the following figures:

FIG. 1 is a schematic view in cross section of a machine according to the prior art.

FIG. 2 is a schematic view in cross section of a machine according to a first embodiment of the invention.

FIG. 6 is a schematic view in cross section of the layering device of a machine according to a third embodiment of the invention.

FIG. 7 is a more detailed schematic view in cross section of a preferred variant of the layering device in FIG. 6.

FIG. 8 is a schematic view in cross section of the layering device of a machine according to a fourth embodiment of the invention.

FIGS. 9 to 12 are schematic views depicting the layering device in FIG. 8 during successive stages of the layering process.

In the different figures, identical or similar elements bear the same references. The description of their structure and their function is not repeated systematically, however.

Figure 5:
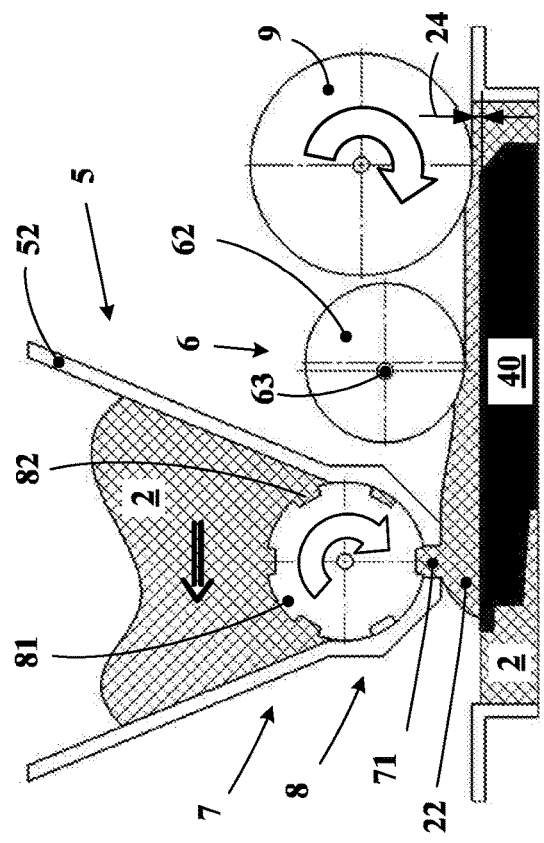
FIG. 5 is a more detailed schematic view in cross section of a preferred variant of the layering device in FIG. 4.

In FIG. 1, a machine for additive manufacturing of a component 40 according to the prior art is illustrated schematically. A source of energy, in this case a laser source 10, emits a laser beam 3 of which the orientation is controlled by mirrors that are subjected to galvanometers 20. An optical lens 30 permits the beam 3 to be focussed at the level of the working zone 4 in order to heat the upper layer of the powder 2 according to a precise pattern and thus to bring about melting of the powder in a selective manner. After treatment of a powder layer by the beam, the working tray 60 is lowered by a unit thickness and is covered with a new powder layer, continuing in this manner in order to form the component 40 layer by layer. Depending on the types of energy beam and the powders that are used, the thickness of a powder layer may vary from a few micrometres (for example 10 μm) to several hundred micrometres (for example 500 μm=0.5 mm). When the component 40 is finished, that is to say when the hundreds or the thousands of layers necessary for its construction have been successively solidified, the component is removed from the working zone.

All of the parts of the machine permitting the application of a new powder layer on the working zone are generally referred to as the "layering device". The layering device that is familiar from the prior art comprises storage means 5 and distributing means 6 for distributing the powder 2 on the working zone 4. As described above, the storage means familiar from the prior art generally make use of a vertically mobile tray 51 similar to the working tray 60. The purpose of the distributing means 6 (not illustrated in detail in FIG. 1) is to distribute a thin layer of powder on the whole of the working zone. The purpose of the feeding means 7 (not illustrated in detail in FIG. 1) is to transfer the powder from the storage means to the distributing means 6. The distributing means and the feeding means that are familiar from the prior art commonly make use of scrapers and/or rollers carried by one or a plurality of carriages, said carriages being mobile between the storage means 5 and the working zone 4. Dosing means 8, in this case means permitting the raising of the mobile tray 51 to be controlled precisely, permit the quantity of powder used for each operation of the layering device to be controlled. Once the distributing means have moved across the working zone (towards the left in FIG. 1), the surplus powder is pushed into a recovery container 21.

FIG. 2 represents a first embodiment of the machine 1 according to the invention and, in particular, an embodiment of its layering device. The source and the control of the energy beam are illustrated in a manner that is identical to the prior art. This is only one example. As described in the preamble to the application, the invention is applicable in reality to all the types of powder-based additive manufacturing by sintering or by total melting of the granules of said powder using an energy beam such as electromagnetic radiation (for example a laser beam) or a beam of particles (for example an electron beam). The rest of the present description thus concentrates principally on the process and the layering device.

The storage means 5 have the form of a hopper 52 located above the plane of the working zone 4. The distributing means 6 use a scraper 61. The scraper is integral with the hopper. The feeding means 7 simply use a lower opening 71 in the hopper in order to transfer the powder towards the distributing means 6 by gravity. Dosing means, in the form of a rotating dosing cylinder 81 comprising at least one cavity, permit the quantity of powder transferred to be controlled. Said cavity, preferably a groove 82, defines a reproducible dose of powder. The one or more grooves 82 extend substantially for the whole of the useful length of the dosing cylinder 81, that is to say substantially for the whole of the width of the working zone 4. The dimensions and the form of the cross section of the grooves 82 may vary along the length of the cylinder 81 in order to further improve the distribution of the powder on the whole of the working zone.

Figure 3:
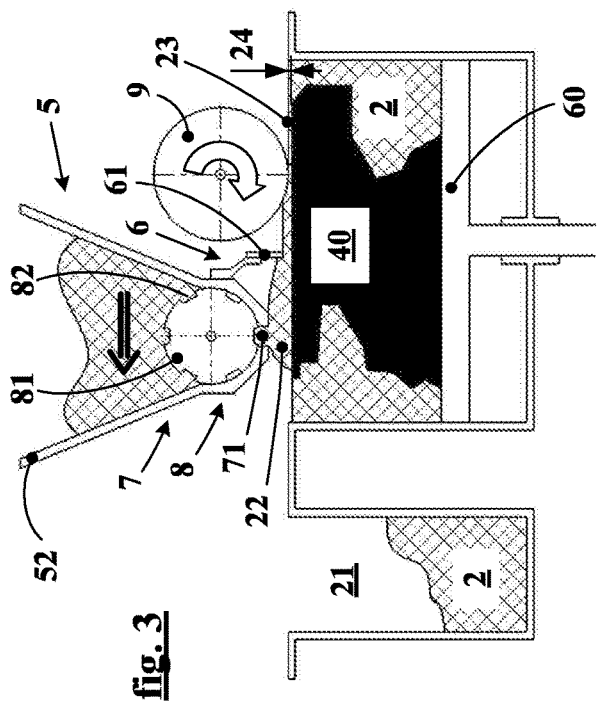
FIG. 3 is a schematic view in cross section of the layering device of a preferred variant of the machine in FIG. 2.

In FIG. 3, the device in FIG. 2 is depicted during the layering operation. The thicknesses of powder are generally shown highly magnified in the present application in order for them to be readily visible by the reader, as is often also the case in the documents associated with the prior art. It is, in point of fact, impossible to show a thickness of 50 μm and a working zone of 500 mm in length, for example, in the same drawing while faithfully respecting the proportions.

In FIG. 3, the hopper 52 is displaced towards the left of the figure at the same time as the scraper 61. The scraper distributes and smoothes the powder layer on the working zone 4. The mass 22 of powder situated ahead of the scraper is dosed by the dosing cylinder 81. The application of powder may take place on a single occasion for each layer. The dosage is preferably progressive, however, that is to say that the application of powder takes place progressively by delivering the contents of a groove on a number of occasions in the course of the passage over the working zone, which permits the variability of the working conditions of the scraper to be reduced and, accordingly, an improved regularity of the thickness and the compactness of the resulting bed of powder to be guaranteed.

FIG. 3 illustrates in addition a preferred variant of the first embodiment of the invention, in which a compacting roller 9 is used in addition. The final thickness 24 of the layer 23 of powder is thus the result of two successive operations. A first thickness is defined by the distributing means 6, in this case the scraper 61. This thickness is then reduced and is made even more homogeneous by the action of the compacting roller 9. The roller is displaced together with the hopper and the scraper. More preferably, the roller is counter-rotating, that is to say that it is motorized in such a way as to rotate in the opposite direction to its displacement relative to the bed of powder (as indicated by the arrow, which shows a rotation in the clockwise direction, while the roller is moving towards the left).

Figure 4:
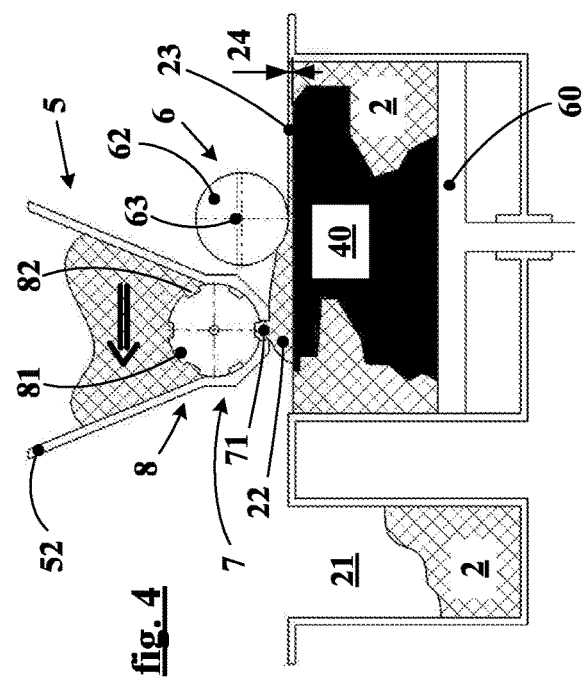
FIG. 4 is a schematic view in cross section of the layering device of a machine according to a second embodiment of the invention.

Depicted in FIG. 4 is a second embodiment of the layering device, in which the distributing means 6 use a distribution cylinder 62 in place of the scraper of the first embodiment. The displacement of the distribution cylinder 62 is linked to that of the hopper 51, as in the case of the scraper 61 in the first embodiment. The cylinder 62 may be fixed in rotation or counter-rotating. When the distribution cylinder is fixed, its fixation 63 is preferably eccentric, which permits the fine regulation of its height and thus of the final thickness 24 of the resulting powder layer 23.

As depicted in FIG. 5, a counter-rotating compacting roller 9 may be advantageously associated with the layering device according to the second embodiment under the same conditions as those described above with reference to FIG. 3.

FIG. 6 depicts a third embodiment. It differs in principle from the first embodiment in that the dosing means 8 use a sliding trapdoor 84, of which the duration and the amplitude of opening influence the quantity of powder transferred to the distributing means 6. Preferably, the storage means 5 use a flexible hopper 53 carried by a hopper support 54 in order to reduce the risk of blocking of the powder. Depending on the types of powder used, supplementary active unblocking means (not illustrated here) may be deployed.

Depicted in FIG. 7 is a variant of the third embodiment comprising in addition a counter-rotating compacting roller 9, of which the displacements are integral with the scraper and the hopper, as described above with reference to FIG. 3.

FIG. 8 depicts a fourth embodiment of the layering device according to the invention, in which the dosing means 8 and the distributing means 6 use a common rotating cylinder 64. The dosage function is assured by a groove 82 in the common cylinder 64 according to the principle described above with reference to FIG. 2. The distribution function is assured by a smoothing section 65 of the common cylinder 64 according to the principle described above with reference to FIG. 4. One advantage of this embodiment is that it permits further lightening of the layering device of the machine according to the invention. The common cylinder 64 is preferably fixed in rotation during its displacement on the working zone. The smoothing section 65, that is to say the part of the common cylinder that is intended for the distribution of the powder, is delimited symbolically by dotted lines in FIGS. 8 to 12. This section preferably includes a swelling 66. This swelling of low overall height (for example a few tenths of a millimetre at most) is scarcely perceptible in the figures in spite of its magnification.

The operation of this embodiment is illustrated in detail in FIGS. 9 to 12, which show the successive configurations of the device in the course of a layering cycle.

In FIG. 9, the layering device is in a waiting configuration, for example between two successive layers. The powder 2 is retained in the closed hopper 52 by the hermetic contact of the common cylinder 64. The groove 82 is then able to charge itself with powder.

In FIG. 10, the common cylinder 64 has rotated through about half a revolution in the anticlockwise direction and has deposited a dose of powder in the vicinity of the working zone 4.

In FIG. 11, the common cylinder 64 has rotated through about a quarter of a revolution in the clockwise direction in order to bring the smoothing section 65 into contact with the mass of powder 22 and at the appropriate height. The fact that the smoothing section includes a swelling 66 permits the fine regulation of the smoothing thickness by the choice of the angle adopted by the common cylinder 64.

In FIG. 12, the layering device passes over the working zone 4, as described previously, pushing the mass of powder 22 above the component 40 in order to smooth a powder layer 23 having a final thickness 24. In order to limit the variations in pressure over the entire length of the working zone, the feed phase described in FIGS. 9 and 10 may be repeated on one or a number of occasions in the course of a single passage over the working zone, in which case the dose defined by the groove 82 preferably represents a fraction of the quantity of powder necessary for a complete layer.

Alternatively, the powder depositing phase may be performed several times in succession in the absence of any smoothing movement in order to create, in the configuration in FIG. 10, a mass 22 corresponding to a plurality of unit doses as defined by the groove 82.

It should be noted (as explained above) that the thicknesses of the layers, the volumes of the masses, the grooves or the swelling 66 are not represented on a consistent scale and, quite the reverse, are deliberately distorted for the purpose of making the figures legible.

Of course, as described above for the other embodiments of the invention (see, for example, the embodiment in FIG. 7), the layering device in FIGS. 8 to 12 may preferably comprise in addition a counter-rotating compactor roller (not illustrated here), of which the displacement is integral with the displacement of the feeding means and the dosing means, that is to say in this case with the hopper 52 and the common cylinder 64.

Alternatively, the smoothing section 65 of the common cylinder 64 may exhibit a reduction in radius at the point of the increase in the radius (swelling 66) illustrated and described with reference to FIGS. 9 to 12. Whether this involves an increase or a reduction in the radius, it is this variation in the radius that permits the adjustment of the height of the cylinder (and thus the fine adjustment of the smoothing thickness) by the choice of the angle adopted by the common cylinder 64.

It will be appreciated that a layer may be produced according to the invention in a single pass, that is to say in a single passage over the working zone. The quantity of powder stored in the hopper is preferably sufficient to produce hundreds, and even thousands, of layers, that is to say that the machine could achieve additive manufacturing of a single complete component, or even of a plurality of complete components, without recharging the hopper. Recharging of the hopper preferably takes place at the moment when the manufacturing of a component is completed, and the finished component is preferably removed before new manufacturing commences.

The powder used is preferably a metallic or ceramic powder. Depending on the types of energy beams that are used and depending on the thickness of the final layer referred to here, the average diameter of the particles of the powder may vary from a few microns (for example 5 µm) to 300 or 400 µm.

A person skilled in the art will appreciate that the different embodiments described and illustrated here are specific examples of combinations of means according to the invention. Other obvious combinations or substitutions of the different means are likewise part of the invention, for example the replacement in the third embodiment (FIGS. 6 and 7) of the scraper 61 by a distribution cylinder 62 according to the second embodiment in FIGS. 4 and 5.

The invention claimed is:

1. A process for additive manufacturing by sintering or melting powder in a working zone using an energy beam, the process comprising steps of:
   providing powder to a machine that includes: (1) a storage apparatus, which is structured to store the powder, and (2) a distribution cylinder, which is structured to produce a layer of the powder in the working zone, the distribution cylinder: (a) being attached to a base portion of the storage apparatus, (b) having an outer circumference that includes a dosing section and a smoothing section, and (c) having an axis of rotation;
   loading the dosing section by rotating the distribution cylinder so that a surface recess, which forms the dosing section of the outer circumference, receives a predetermined quantity of the powder from the storage apparatus;
   during a dosing procedure, delivering the predetermined quantity of the powder to the working zone by rotating the distribution cylinder so that the dosing section passes by an opening in the storage apparatus facing the working zone; and
   during a smoothing procedure, translationally moving the distribution cylinder, without rotation, along a direction parallel to a surface of the working zone so that the smoothing section contacts the powder in the working zone through the opening in the storage apparatus to distribute and smooth the powder in the working zone into a layer having a predetermined thickness.

2. The process according to claim 1, wherein the outer circumference of the distribution cylinder includes the dosing section, the smoothing section, and a third section different from the dosing section and the smoothing section, and
   wherein a radial distance from the axis of rotation to a point on the outer circumference in the smoothing section is different from a radial distance from the axis of rotation to a point on the outer circumference in the third section.

3. The process according to claim 2, further comprising a step of, during a waiting procedure occurring before the dosing procedure and after the smoothing procedure, holding the distribution cylinder at a position that is away from above the working zone, such that the third section faces the opening in the storage apparatus during the waiting procedure.

4. The process according to claim 3, wherein the distribution cylinder rotates in a same rotational direction to go from the waiting procedure to the dosing procedure, and to go from the dosing procedure to the smoothing procedure.

5. The process according to claim 3, wherein the distribution cylinder rotates in a first rotational direction during the dosing procedure, and rotates in a second rotational direction to go from the dosing procedure to the smoothing procedure, the second rotational direction being opposite the first rotational direction.

6. The process according to claim 2, wherein the smoothing section includes a swelling portion such that the radial distance in the smoothing section is greater than the radial distance in the third section.

7. The process according to claim 1, further comprising a step of, during the smoothing procedure and before translationally moving the distribution cylinder:
   rotating the distribution cylinder to a predetermined angular position so that the smoothing section faces the working zone via the opening in the storage apparatus, and then
   stopping rotation of the distribution cylinder when the predetermined angular position has been reached.

8. The process according to claim 7, wherein a radial distance from the axis of rotation to a first point on the smoothing section is different from a radial distance from the axis of rotation to a second point on the smoothing section, and
   wherein:
   when the distribution cylinder is rotated to a first predetermined angular position so that the first point faces the working zone and contacts the powder in the working zone during the smoothing procedure, the predetermined thickness after the smoothing procedure has a first value, and,
   when the distribution cylinder is rotated to a second predetermined angular position so that the second point faces the working zone and contacts the powder in the working zone during the smoothing procedure, the predetermined thickness after the smoothing procedure has a second value different from the first value.

9. The process according to claim 1, wherein the smoothing section has a variation in a radial distance from the axis of rotation to points along the smoothing section such that the predetermined thickness of the layer of powder is adjustable according to an angular position of the distribution cylinder during the smoothing procedure.

* * * * *